(12) United States Patent
Bahr et al.

(10) Patent No.: US 7,526,978 B2
(45) Date of Patent: May 5, 2009

(54) BALL COUPLING DEVICE FOR KEEPING TWO SLIDING SHAFTS ARTICULATED

(75) Inventors: Christophe Bahr, Vendome (FR); Arnaud Janvier, Saint Hilaire la Gravelle (FR)

(73) Assignee: ZF Systemes de Direction Nacam, S.A.S., Vendome (FR)

(*) Notice: Subject to any disclaimer, the term of this patent is extended or adjusted under 35 U.S.C. 154(b) by 556 days.

(21) Appl. No.: 11/224,386

(22) Filed: Sep. 12, 2005

(65) Prior Publication Data

US 2006/0053934 A1    Mar. 16, 2006

(30) Foreign Application Priority Data

Sep. 14, 2004   (FR) .................................. 04 09729

(51) Int. Cl.
*B62D 1/16* (2006.01)
(52) U.S. Cl. ........................................ 74/492; 464/167
(58) Field of Classification Search ............... 74/492, 74/493; 464/167; 384/49
See application file for complete search history.

(56) References Cited

U.S. PATENT DOCUMENTS

| | | | | |
|---|---|---|---|---|
| 5,397,271 | A | * | 3/1995 | Poulin ........................ 464/111 |
| 6,200,225 | B1 | * | 3/2001 | Hobaugh, II ................ 464/167 |
| 6,343,993 | B1 | * | 2/2002 | Duval et al. ................ 464/167 |
| 6,510,756 | B2 | * | 1/2003 | Aota ........................... 74/492 |

FOREIGN PATENT DOCUMENTS

| | | |
|---|---|---|
| DE | 85 10 410.8 | 7/1986 |
| DE | 37 40 755.4 | 12/1987 |
| FR | 2 795 786 | 1/2001 |
| WO | WO 2004/050453 | 6/2004 |

* cited by examiner

*Primary Examiner*—Richard W L Ridley
*Assistant Examiner*—Phillip Johnson
(74) *Attorney, Agent, or Firm*—Lawrence E. Laubscher, Sr.; Lawrence E. Laubscher, Jr.

(57) ABSTRACT

Device for coupling an inner shaft and an outer shaft that slide in the direction of a common axis with balls disposed between the two shafts. The balls are disposed in axial grooves of the inner shaft and in axial grooves of the outer shaft. Each row of balls is held by a double spring member that bears on the groove and which pushes on two rolling tracks for the balls, which come into contact with the groove. The two rolling tracks are articulated at the junction of the groove and the inner shaft.

9 Claims, 6 Drawing Sheets

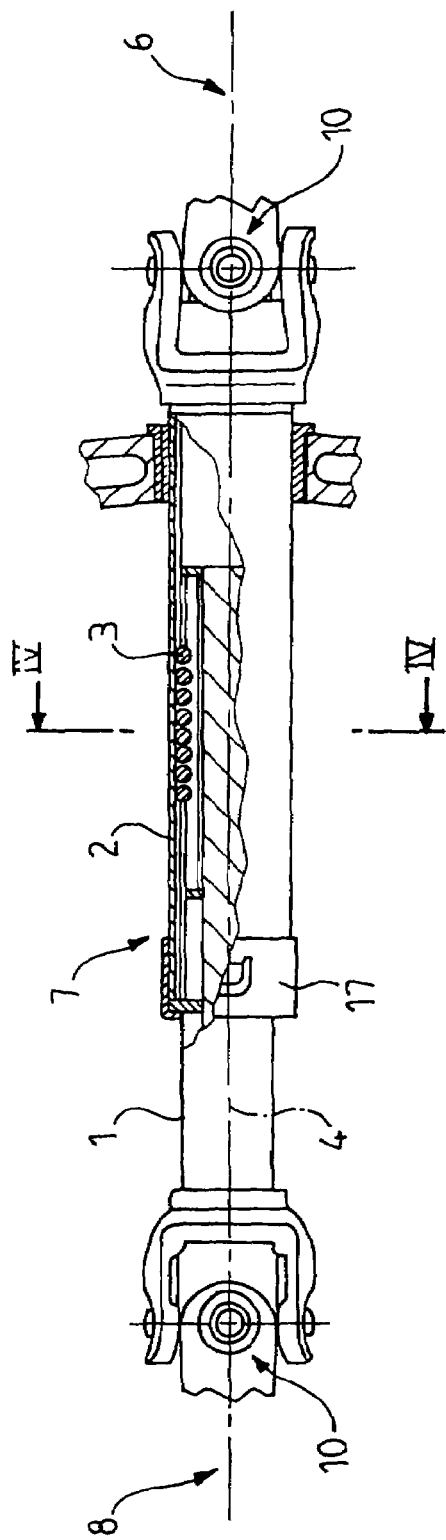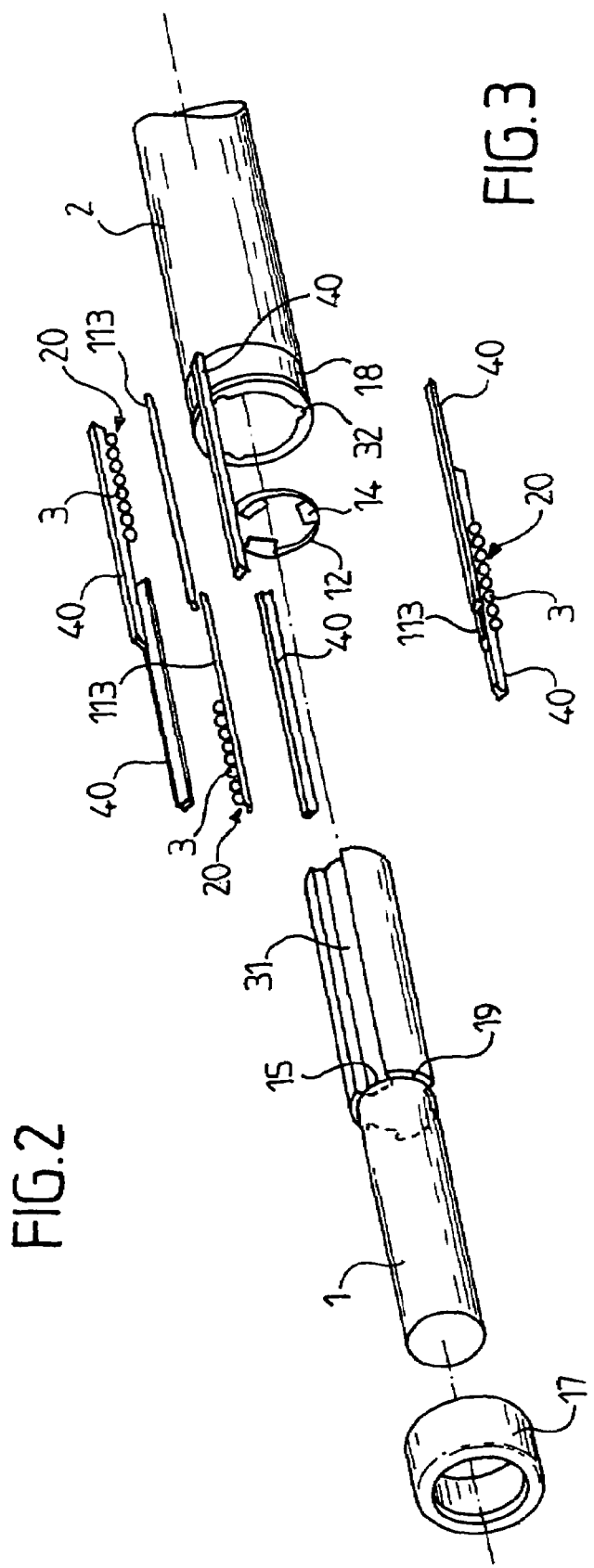

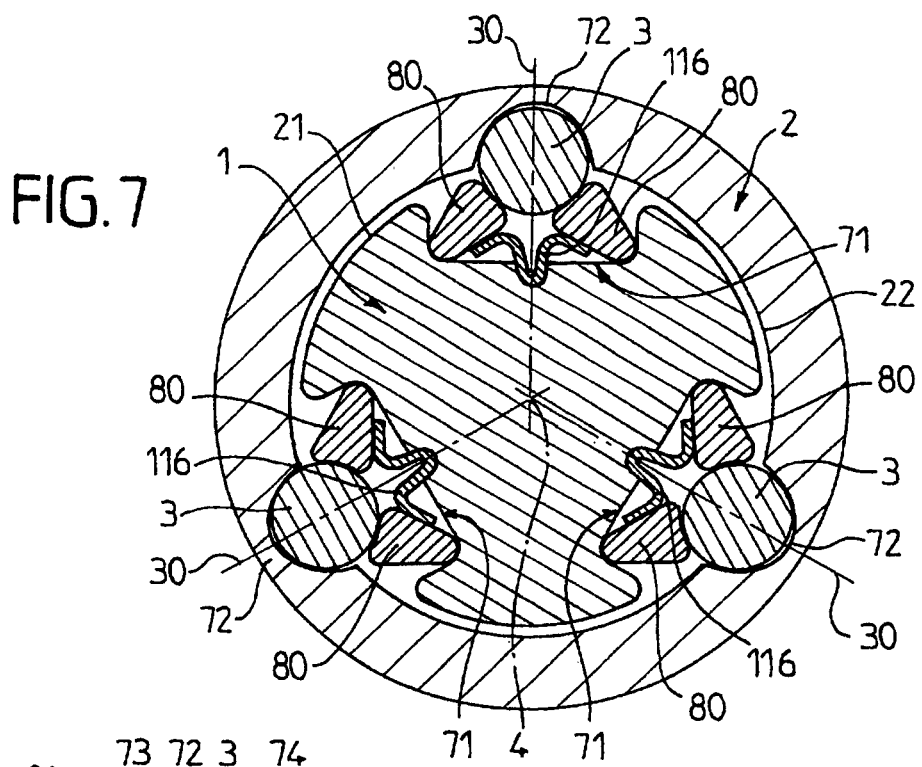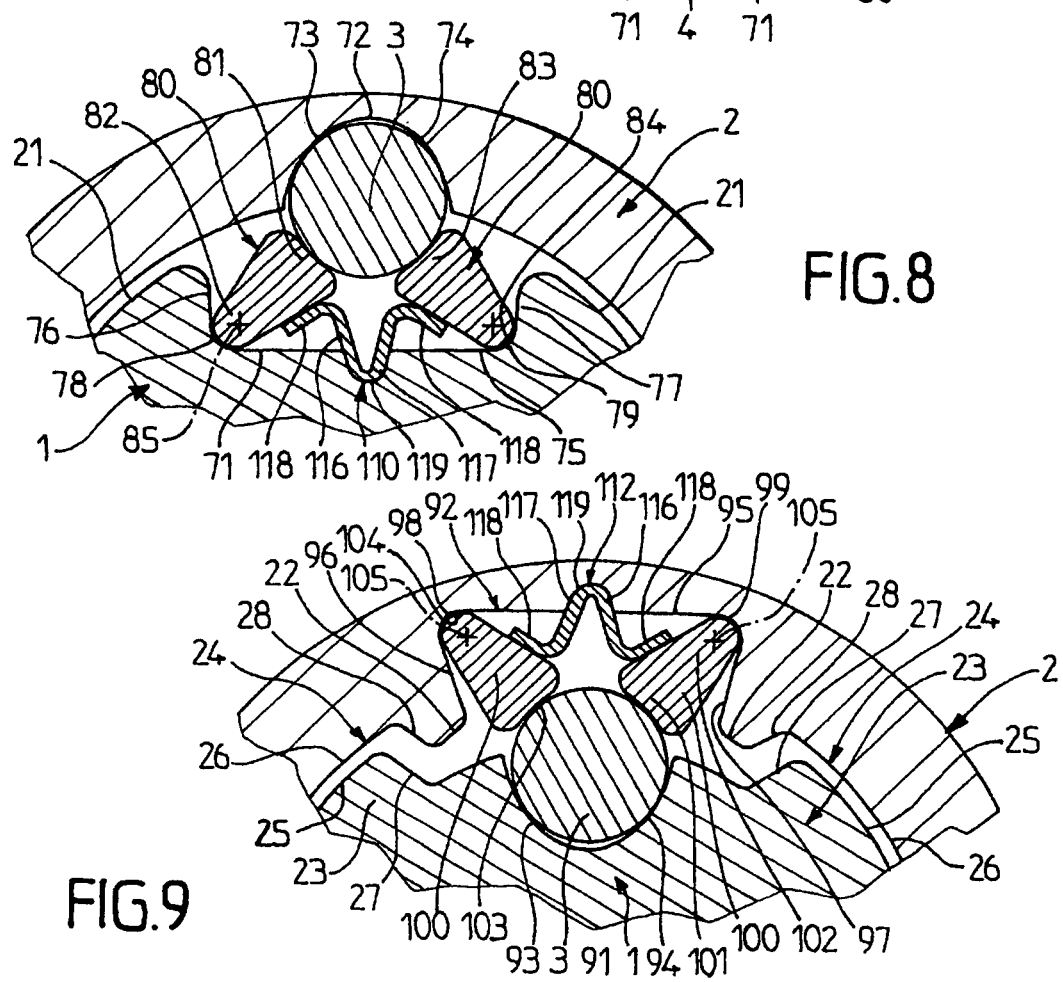

BALL COUPLING DEVICE FOR KEEPING TWO SLIDING SHAFTS ARTICULATED

BACKGROUND OF THE INVENTION

1—Field of the Invention

The invention relates to a device for rotationally coupling two shafts sliding along their common axis. The coupling device of the invention applies in particular to an automobile vehicle steering column, in which it is fitted to the intermediate column part connected to the steering box or the upper column part connected to the steering wheel.

2—Description of the Prior Art

In the more particular case of the intermediate shaft, the latter has a universal joint at each end: one universal joint is connected to the movement input of the steering box and the other universal joint is connected to the column top. For correct steering of modern automobile vehicles, it is necessary for the length of the intermediate shaft to be variable and to adapt to oscillations of the front drive train of the vehicle, which oscillations are caused by the profile and the surface state of the road covering. This characteristic is also required to facilitate assembly to the pinion of the rack and pinion and to absorb movement in the event of a head-on impact to the vehicle.

The intermediate shaft must therefore have a variable length, i.e. it must have a function of sliding of two shafts relative to each other along their common axis, which is the axis of the intermediate part. Moreover, there must be a function of transmission of rotation movement between the two shafts and of transmission of the rotation torque necessary for the steering maneuver.

There are many sliding shaft coupling devices that associate the passage of the rotation torque between the two shafts by the use of splines with conjugate profiles formed on each of the two shafts. However, this type of device exhibits play after an endurance test cycle equivalent to the service life of a vehicle, which is that required on modern automobiles. To delay the onset of this play, the sliding fit of the two shafts at the fabrication stage is relatively tight, which calls for a relatively high axial force during assembly on the production line, which increases the fitting time and makes fitting more difficult.

This fit must be accurate to enable axial movements to be absorbed correctly in operation. The axial force during transmission of rotation torque is a function of the torque to be transmitted, and there is an increase in the sliding force linked to the torque to be transmitted and to the coefficient of friction, followed by a sudden axial unlocking, which causes jerks that compromise maintaining a good sliding fit with reduced play, leading to a poor driving "feel".

There also exist coupling devices that inject plastics material over splined portions of a metal male shaft and a metal female tube. This solution gives rise to problems absorbing axial movements under high torque; the sliding forces increase in proportion to the friction forces between the two parts. Moreover, plays appear following wear of the injected plastics material. A final existing solution introduces rolling elements and stress springs between the shaft and the tube. This solution, which is satisfactory for sliding under torque, causes angular stiffness problems as it is directly proportional to the stiffness and to the prestressing of the springs.

OBJECT OF THE INVENTION

The object of the present invention is to propose a sliding shaft coupling device that avoids the disadvantages referred to above, i.e. a device that requires an axial force that is not linked to the torque to be transmitted. It is therefore necessary for the axial force to increase very little when the rotation torque to be transmitted increases and for the angular transmission stiffness to be high. Moreover, there must be no play after the endurance test cycle and the device for coupling the two shafts must be easy to fit in the spaces available in existing automobile vehicles and with a lower axial fitting force.

SUMMARY OF THE INVENTION

The invention relates to a device for coupling two shafts: an inner shaft and an outer shaft that slide one within the other in the direction of their common axis. Said device for coupling two shafts includes balls that are disposed between the inner shaft and the outer shaft.

In the coupling device, each of said balls is disposed on the one hand in a concave portion of the inner shaft and on the other in a concave portion of the outer shaft.

Each of said balls moves on two rolling tracks disposed one on each side of a median plane passing through the common axis and through the centers of said balls. Each of the two rolling tracks cooperates with the concave portion of one of the two shafts and pivots about an articulation axis. The rolling tracks and the corresponding articulation axis are parallel to the common axis. Each of the two rolling tracks is pushed against each of said balls by a spring member disposed in and bearing on said concave portion. The two spring members can constitute a double spring member. Each of said balls rolls directly against the concave portion of the other shaft.

The assembling is embodied so that at rest, when there is no transmission of torque, and when active, when there is transmission of torque, each of said balls is always in contact on each side of the median plane, via one bearing area, with the corresponding rolling track disposed in one of the two shafts, and through another bearing area with the concave portion of the other shaft, and the center of each of said balls, the center of the bearing area with the rolling track and the corresponding center of the articulation axis of said rolling track are always aligned.

In an assembling type of the invention, the articulation axis is situated between the sliding face of one of the two shafts and the concave portion of said shaft, so that each rolling track pivots at the junction of the sliding face and the concave portion.

In another assembling type, the articulation axis is situated inside the concave portion of one of the two shafts, so that each rolling track pivots in said concave portion.

To increase the operation safety of the coupling device of the invention, male and female grooves with conjugate profiles having a certain play are formed on the inner shaft and the outer shaft so that torque can still be transmitted between the inner shaft and the outer shaft in the event of breakage of the balls.

Plural structures of the coupling device can be embodied. In one structure, the spring members are disposed in the inner shaft. In another structure, the spring member or the spring members is/are disposed in the outer shaft.

In another structure, some of the spring members are disposed in the inner shaft and others spring members are disposed in the outer shaft.

In a particular arrangement of the invention, the device has the balls disposed in a plurality of axial rows.

For each row of balls, there is formed in the outer shaft a concave portion in the form of an axial groove whose section includes two concave faces inclined to each other which come into contact with the balls.

For each row of balls, there is formed in the inner shaft a concave portion in the form of an axial groove whose section includes a bottom and two flanks, the bottom being substantially perpendicular to the median plane passing through the common axis and through the axis of the centers of the balls of said row.

For each row of balls, two rolling tracks are disposed one on each side of the median plane and cooperate with the concave portion in the form of the axial groove of the inner shaft. Each rolling track takes the form of an axial bar whose section has a bearing portion and a pivot portion.

The bearing portion has a face adapted to come into contact with the balls. The pivot portion is in the form of a fork with a concave face that cooperates with a conjugate convex shape of the junction face disposed between the sliding face of the inner shaft and the corresponding flank of the axial groove, the concave face and the junction face having a substantially cylindrical shape whose axis is the articulation axis. Each of the two rolling tracks is pushed by a spring member that bears on the bottom of the axial groove.

In another particular arrangement of the invention, the coupling device has the balls disposed in a plurality of axial rows.

For each row of balls, there is formed in the inner shaft a concave portion in the form of an axial groove whose section includes two concave faces inclined to each other which come into contact with the balls.

For each row of balls, there is formed in the outer shaft a concave portion in the form of an axial groove whose section includes a bottom and two flanks, the bottom being substantially perpendicular to the median plane passing through the common axis and through the axis of the centers of the balls of said row.

For each row of balls, two rolling tracks are disposed one on each side of the median plane and cooperate with the concave portion in the form of the axial groove of the outer shaft. Each rolling track takes the form of an axial bar, whose section has a bearing portion and a pivot portion.

The bearing portion has a face adapted to come into contact with the balls. The pivot portion is in the form of a fork with a concave face which cooperates with a conjugate convex shape of the junction face disposed between the sliding face of the outer shaft and the corresponding flank of the axial groove, the concave face and the junction face having a substantially cylindrical shape whose axis is the articulation axis. Each of the two rolling tracks is pushed by a spring member which bears on the bottom of the axial groove.

In another particular arrangement of the invention, the coupling device has the balls disposed in a plurality of axial rows.

For each row of balls, there is formed in the outer shaft a concave portion in the form of an axial groove whose section includes two concave faces inclined to each other which come into contact with the balls.

For each row of balls, there is formed in the inner shaft a concave portion in the form of an axial groove whose section includes a bottom and two flanks, the bottom being substantially perpendicular to the median plane passing through the common axis and through the axis of the centers of the balls of said row.

For each row of balls, two rolling tracks are disposed one on each side of the median plane and cooperate with the concave portion in the form of the axial groove of the inner shaft. Each rolling track takes the form of an axial bar whose section has a bearing portion and a pivot portion.

The bearing portion has a face adapted to come into contact with the balls. The pivot portion of rounded is shaped with a convex face that cooperates with a conjugate concave shape of the junction face disposed between the bottom and the corresponding flank of the axial groove, the convex face and the junction face having a substantially part-cylindrical shape whose axis is the articulation axis. Each of the two rolling tracks is pushed by a spring member which bears on the bottom of the axial groove.

In another particular arrangement of the invention, the device has the balls are disposed in a plurality of axial rows.

For each row of balls, there is formed in the inner shaft a concave portion in the form of an axial groove whose section includes two concave faces inclined to each other which come into contact with the balls.

For each of the balls, there is formed in the outer shaft a concave portion in the form of an axial groove whose section includes a bottom and two flanks, the bottom being substantially perpendicular to the median plane passing through the common axis and through the axis of the centers of the balls of said row.

For each row of balls, two rolling tracks are disposed one on each side of the median plane and cooperate with the concave portion in the form of the axial groove of the outer shaft and each rolling track takes the form of an axial bar whose section has a bearing portion and a pivot portion.

The bearing portion has a face adapted to come into contact with the balls. The pivot portion of rounded is shaped with a convex face that cooperates with a conjugate concave shape of the junction face disposed between the bottom and the corresponding flank of the axial groove, the convex face and the junction face having a substantially part-cylindrical shape whose axis is the articulation axis. Each of the two rolling tracks is pushed by a spring member that bears on the bottom of the axial groove.

According different embodiments of the invention, each of the two rolling tracks is pushed by a spring member that bears on the bottom of the axial groove and that is in the form of an axial coil spring or in the form of an axial spring member.

In other embodiments of the invention, the two rolling tracks are pushed by two spring members, which are connected to constitute a double spring member in the form of a double axial spring member which has a section of thin thickness. In one embodiment, there is a rounded central portion that bears on the bottom of the axial groove and two curved ends which act on said rolling tracks. In another embodiment there is a bent central portion, the bend of which engages in and bears in an axial housing of the bottom of the axial groove, and whose curved ends act on said rolling tracks.

In a assembling of the coupling device particularly well balanced, the balls are arranged in three axial rows. The axial rows are transverse at 120° to each other. The inner shaft has three axial grooves transverse at 120° to each other. The outer shaft has three axial grooves transverse at 120° to each other.

In another assembling of the coupling device particularly well balanced, the balls are arranged in two diametrically opposite axial rows. The inner shaft has two diametrically opposite axial grooves. The outer shaft has two diametrically opposite axial grooves.

In a complete structure of the device according to the invention, the inner shaft has three axial grooves transverse at 120° to each other. An axial spring member and two rolling tracks in the form of axial bars are mounted in each axial groove.

The balls are arranged in three axial rows transverse at 120° to each other, the balls being held in place by a cage in the form of sleeve.

The combination of the balls, the rolling tracks and the spring members is closed at each end by a shoulder and a retaining ring. The retaining ring engages in each of the axial grooves of the inner shaft.

The outer shaft has three axial grooves transverse at 120° to each other which slide respectively on the rows of balls. The axial grooves have the length required to allow a required axial sliding of the outer shaft and the inner shaft.

The coupling device according to the invention applies to the intermediate part of an automobile vehicle steering column or the top part of an automobile vehicle steering column.

The device of the invention for coupling two shafts along their common axis therefore has the advantage of there always being two bearing areas for each of the interior and exterior shafts and for each row of balls, which are always in contact, even when no rotation torque is being transmitted.

Moreover, a reduced axial force is necessary when fitting on the production line. The precise fit of the coupling device of the invention avoids axial jerks when driving the vehicle, and guarantees good results in the endurance by avoiding play in the coupling. Moreover, the axial force is considerably reduced when rotation torque is being transmitted because of the rolling and sliding contact. Finally, the coupling device may easily be fitted within the existing space for automobile vehicle steering columns.

BRIEF DESCRIPTION OF THE DRAWINGS

Other features and advantages of the present invention will become more clearly apparent on reading the following description of several preferred embodiments of the invention, provided by way of no limiting example, which description is given with reference to the corresponding appended drawings, in which:

FIG. 2 is an axial view of the intermediate part of the automobile vehicle steering system of the FIG. 1 in which one embodiment of the invention is shown in partial axial section;

FIG. 3 is an exploded perspective view of the whole of the FIG. 2 coupling device;

FIG. 7 is a view in cross section in the plane of FIG. 4 of a further embodiment of the invention;

FIG. 8 shows a part of FIG. 7 to a larger scale;

FIG. 9 is a partial cross section analogous to FIG. 8 of another embodiment of the invention;

DESCRIPTION OF THE PREFERRED EMBODIMENTS

The invention relates to a device for rotationally coupling two shafts that slide one within the other along a common axis.

Figure 1:
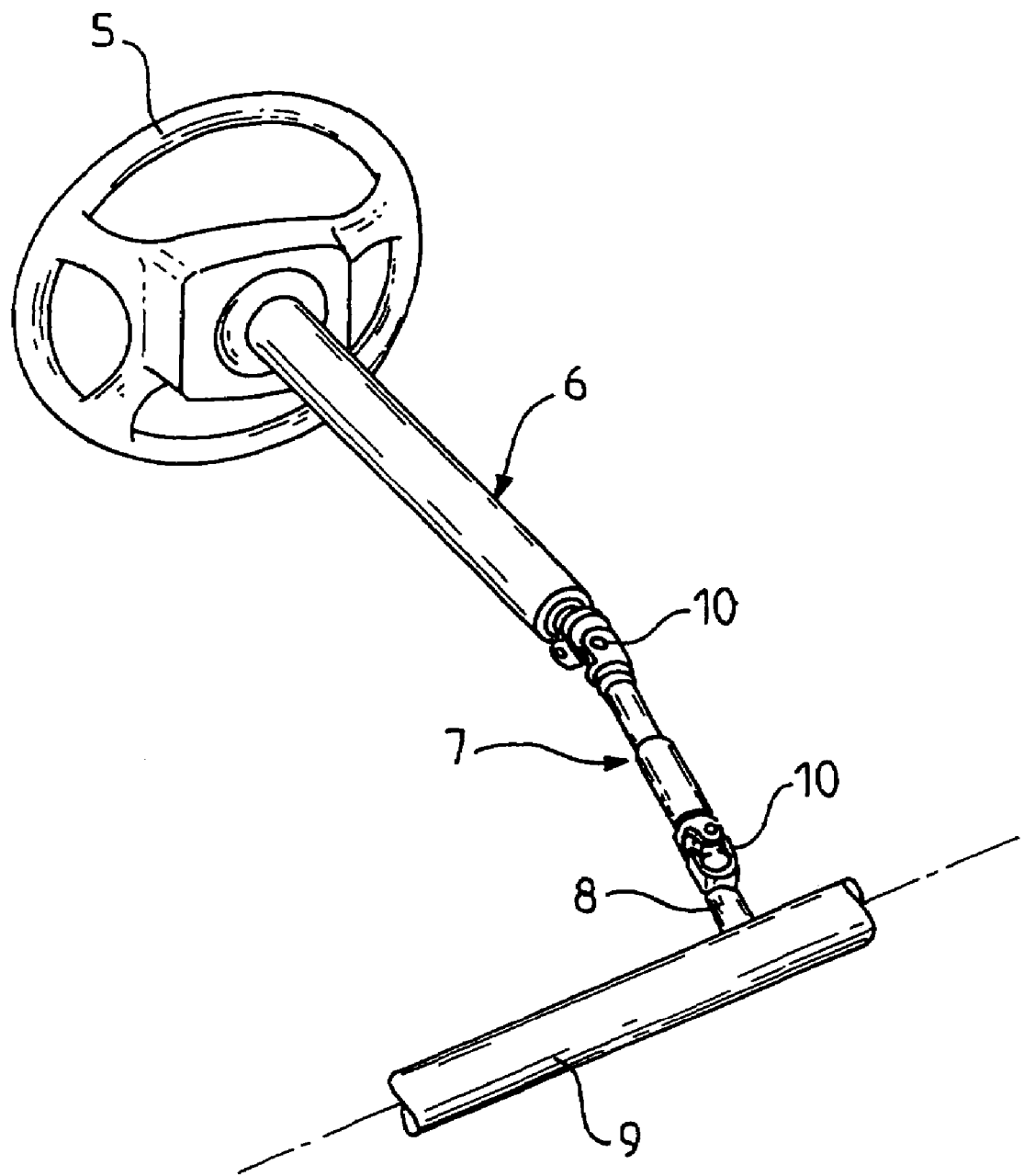
FIG. 1 is a diagrammatic perspective view of an automobile vehicle steering system in which the coupling device of the invention is applied to the intermediate column part.

This coupling device applies particularly well to an automobile vehicle steering system, like the one shown diagrammatically in FIG. 1.

The steering system shown includes a steering column with a top column part 6 also called as a column top and an intermediate column part 7 also called as a intermediate shaft.

The top column part 6 is connected by its upper end to the steering wheel 5 and by its lower end to the intermediate column part 7.

The intermediate column part 7 is connected by its upper end to the top column part 6 and by its lower end to the steering box 8 of the steering rack 9.

The intermediate column part 7 is connected at each of its ends by means of a universal joint, designated 10 for both the top column part 6 and the steering box 8.

The remainder of the description relates to a coupling device in the intermediate column part 7. The coupling device of the invention may also be provided in the top column part 6.

An inner shaft 1 and an outer shaft 2 slide one within the other in the direction of a common axis 4, which is shown in FIGS. 2 and 3. The various embodiments of the device for coupling the two shafts described hereinafter include balls 3. The balls 3 are disposed between the inner shaft 1 and the outer shaft 2. In the coupling device of the invention, each of said balls 3 is disposed in a concave portion of the inner shaft 1 and in a concave portion of the outer shaft 2.

Each of said balls 3 rolls on two rolling tracks that cooperate with the concave portion of one of the two shafts and that pivot about an articulation axis. Each rolling track and the corresponding articulation axis are parallel to the common axis 4. Each of the two rolling tracks is pushed by a spring member that is disposed in and bears against said concave portion. Each of said balls 3 rolls directly against the concave portion of the other shaft.

The coupling device of the invention is adapted so that the balls 3 are always in contact at rest, when there is no transmission of torque, and when active, when there is transmission of torque. On each side of a median plane passing through the center of the balls 3 and through the common axis 4, each of the balls 3 is always in contact through one bearing area with the corresponding rolling track disposed in one of the two shafts and through another bearing area with the concave portion of the other shaft. According to an essential feature of the invention, the center of each of the balls 3, the center of the area of bearing engagement with the rolling track concerned and the corresponding center of the articulation axis of said rolling track are always aligned.

FIG. 2 shows axially the whole of the intermediate column portion 7. The inner shaft 1 and the outer shaft 2 slide with the balls 3 along their common axis 4. The intermediate column part 7 is connected to the steering box 8 by one universal joint 10 and is connected to the top column part 6 by the other universal joint 10.

Figure 4:
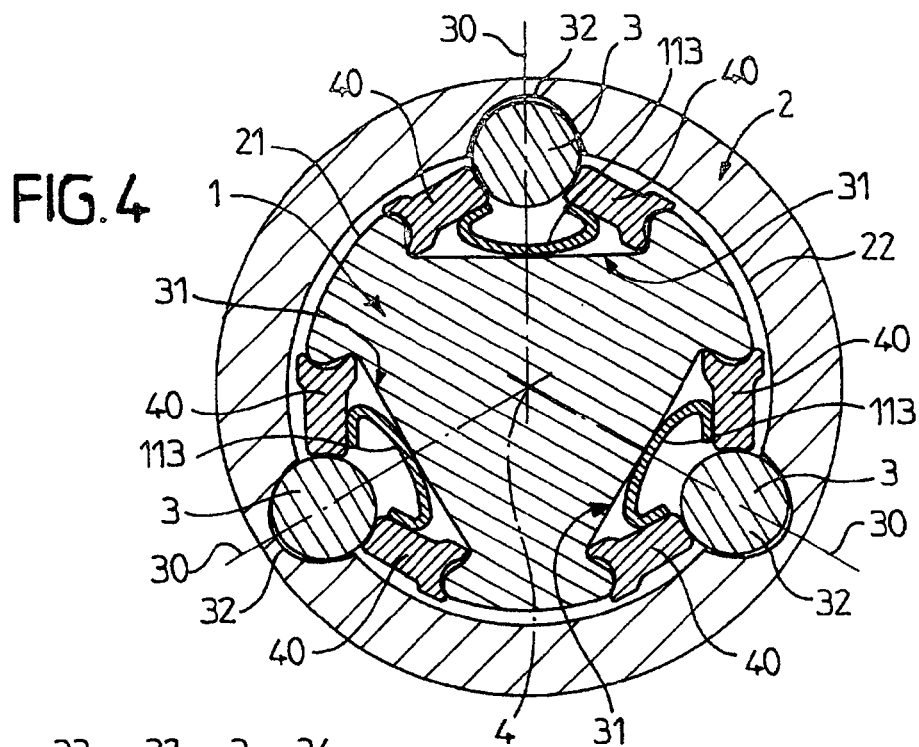
FIG. 4 is a cross section taken along the line IV-IV in FIG. 2.
Figure 5:
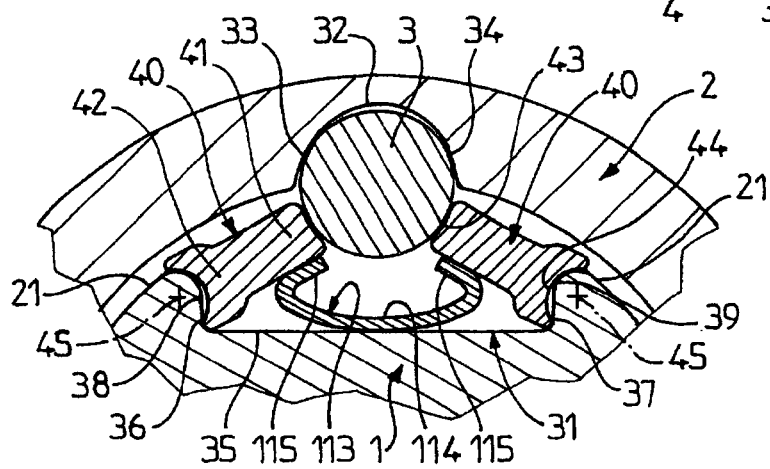
FIG. 5 shows a part of FIG. 4 to a larger scale.

The coupling device, an exploded view of which is to be found in FIG. 3 and a cross-sectional view of which is to be found in FIGS. 4 and 5, includes balls 3 that are disposed in three axial rows 20. The axial rows 20 are situated transversely at 120° to each other. The inner shaft 1 has three axial grooves 31 that are situated transversely at 120° to each other. The outer shaft 2 has three axial grooves 32 that are situated transversely at 120° to each other.

For each row 20 of balls 3, there is formed in the outer shaft 2 a concave portion in the form of an axial groove 32 whose section includes two concave faces 33, 34 inclined to each other that come into contact with the balls 3.

For each row 20 of balls 3 there is formed in the inner shaft 1 a concave portion in the form of an axial groove 31 whose section includes a bottom 35 and two flanks 36, 37. The bottom 35 is substantially perpendicular to the median plane 30 passing through the common axis 4 and through the axis of the centers of the balls 3 of said row 20.

For each row 20 of balls 3, there are two rolling tracks 40 that are disposed one on each side of the median plane 30. The rolling tracks 40 cooperate with the concave portion of the inner shaft 1 in the form of the axial groove 31.

Each rolling track 40 takes the form of an axial bar whose section has a bearing portion 41 and a pivot portion 42.

The bearing portion 41 has a face 43 adapted to come into contact with the balls 3. The pivot portion 42 is in the form of a fork with a concave face 44 that cooperates with a conjugate convex shape of the junction face 38, 39 that is disposed between the sliding face 21 of the inner shaft 1 and the corresponding flank 36, 37 of the axial groove 31. The concave face 44 and the junction face 38, 39 have a substantially part-cylindrical shape the axis whereof is the articulation axis 45.

Each of the two rolling tracks 40 is pushed by a spring member that bears on the bottom 35 of the axial groove 31.

Figure 6:
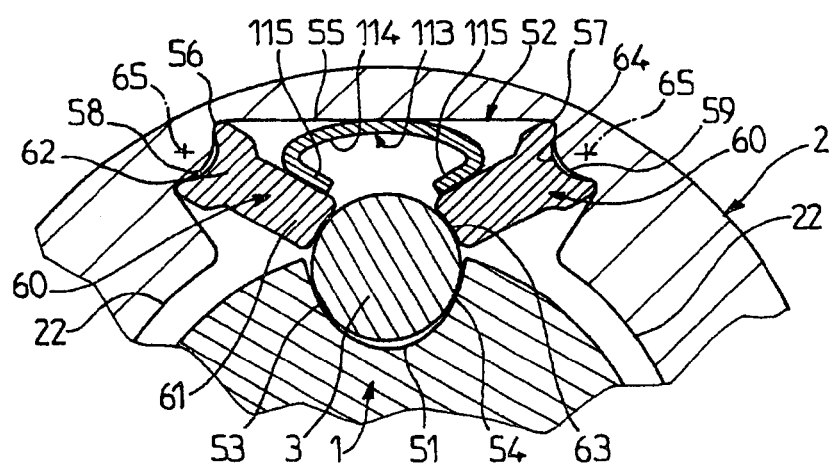
FIG. 6 is a view in cross section in the plane of FIG. 4 of another embodiment of the invention.

The coupling device shown in cross section in FIG. 6 includes balls 3 that are disposed in three axial rows 20.

The axial rows 20 are situated transversely at 120° to each other. The inner shaft 1 is provided with three axial grooves 51 that are situated transversely at 120° to each other. The outer shaft 2 is provided with three axial grooves 52 that are situated transversely at 120° to each other.

For each row 20 of balls 3 there is formed in the inner shaft 1 a concave portion in the form of an axial groove 51 whose section includes two concave faces 53, 54 inclined to each other that come into contact with the balls 3.

For each row 20 of balls 3 there is formed in the outer shaft 2 a concave portion in the form of an axial groove 52 whose section includes a bottom 55 and two flanks 56, 57. The bottom 55 is substantially perpendicular to the median plane 30 passing through the common axis 4 and through the axis of the centers of the balls 3 of said row 20.

For each row 20 of balls 3, two rolling tracks 60 are disposed one on each side of the median plane 30. The rolling tracks 60 cooperate with the concave portion of the outer shaft 2 in the form of the axial groove 52. Each rolling track 60 takes the form of an axial bar whose section has a bearing portion 61 and a pivot portion 62.

The bearing portion 61 has a face 63 adapted to come into contact with the balls 3. The pivot portion 62 takes the form of a fork with a concave face 64 which cooperates with a conjugate convex shape of the junction face 58, 59 that is disposed between the sliding face 22 of the outer shaft 2 and the corresponding flank 56, 57 of the axial groove 52. The concave face 64 and the junction face 58, 59 have a substantially part-cylindrical shape the axis whereof is the articulation axis 65.

Each of the two rolling tracks 60 is pushed by a spring member that bears on the bottom 55 of the axial groove 52.

The coupling device shown in cross section in FIGS. 7 and 8 includes balls 3 that are disposed in three axial rows 20.

The axial rows 20 are situated transversely at 120° to each other. The inner shaft 1 has three axial grooves 71 which are situated transversely at 120° to each other. The outer shaft 2 has three axial grooves 72 that are situated transversely at 120° to each other.

For each row 20 of balls 3, there is formed in the outer shaft 2 a concave portion in the form of an axial groove 72 whose section includes two concave faces 73, 74 inclined to each other that come into contact with the balls 3.

For each row 20 of balls 3, there is formed in the inner shaft 1 a concave portion in the form of an axial groove 71 whose section includes a bottom 75 and two flanks 76, 77. The bottom 75 is substantially perpendicular to the median plane 30 passing through the common axis 4 and through the axis of the centers of the balls 3 of said row 20.

For each row 20 of balls 3, two rolling tracks 80 are disposed one on each side of the median plane 30. The rolling tracks 80 cooperate with the concave portion of the inner shaft 1 in the form of the axial groove 71. Each rolling track 80 takes the form of an axial bar whose section has a bearing portion 81 and a pivot portion 82.

The bearing portion 81 has a face 83 adapted to come into contact with the balls 3. The pivot portion 82 is of rounded shape with a convex face 84 that cooperates with a conjugate concave shape of the junction face 78, 79 that is disposed between the bottom 75 and the corresponding flank 76, 77 of the axial groove 71. The convex face 54 and the junction face 78, 79 have a substantially part-cylindrical shape the axis whereof is the articulation axis 85.

Each of the two rolling tracks 80 is pushed by a spring member that bears on the bottom 75 of the axial groove 71.

The coupling device shown in cross section in FIG. 9 includes balls 3 that are disposed in a plurality of axial rows 20.

The axial rows 20 are situated transversely at 120° to each other. The inner shaft 1 is provided with three axial grooves 91 that are situated transversely at 120° to each other. The outer shaft 2 is provided with three axial grooves 92 that are situated transversely at 120° to each other.

For each row 20 of balls 3 there is formed in the inner shaft 1 a concave portion in the form of an axial groove 91 whose section includes two concave faces 93, 94 inclined to each other that come into contact with the balls 3.

For each row 20 of balls 3, there is formed in the outer shaft 2 a concave portion in the form of an axial groove 92 whose section includes a bottom 95 and two flanks 96, 97. The bottom 95 is substantially perpendicular to the median plane 30 passing through the common axis 4 and through the axis of the centers of the balls 3 of said row 20.

For each row 20 of balls 3, two rolling tracks 100 are disposed one on each side of the median plane 30. The rolling tracks 100 cooperate with the concave portion of the outer shaft 2 in the form of the axial groove 92. Each rolling track 100 takes the form of an axial bar whose section has a bearing portion 101 and a pivot portion 102.

The bearing portion 101 has a face 103 adapted to come into contact with the balls 3. The pivot portion 102 is of rounded shape with a convex face 104 that cooperates with a conjugate concave shape of the junction face 98, 99 that is disposed between the bottom 95 and the corresponding flank 96, 97 of the axial groove 92. The convex face 104 and the junction face 98, 99 have a substantially part-cylindrical shape the axis whereof is the articulation axis 105.

Each of the two rolling tracks 100 is pushed by a spring member that bears on the bottom 95 of the axial groove 92.

Figure 10:
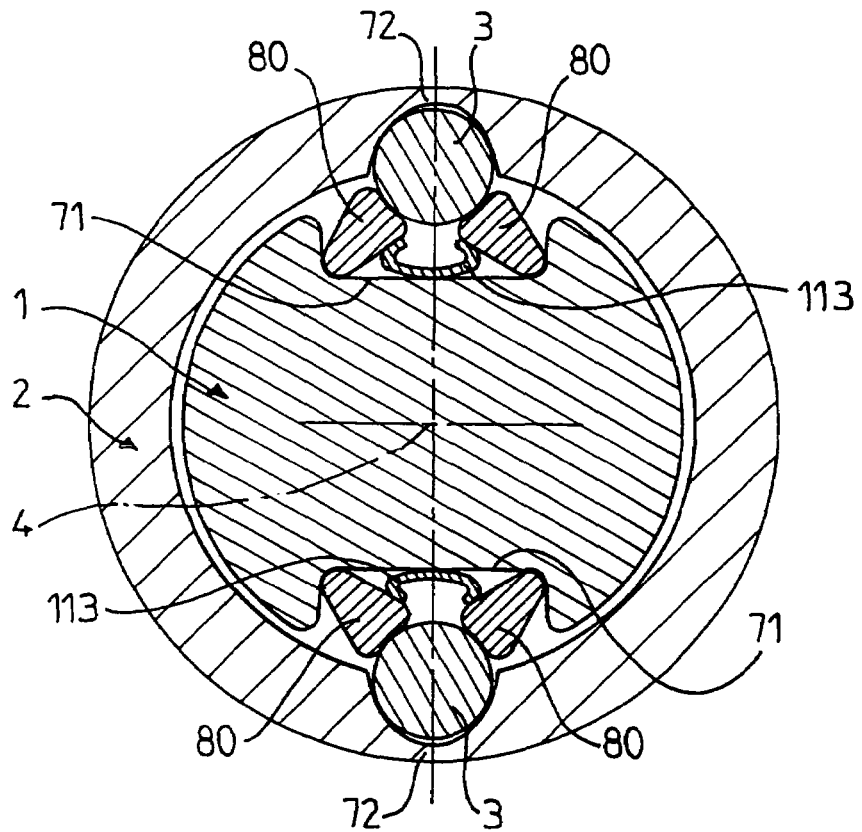
FIG. 10 is a cross section in the plane of FIG. 4 of a further embodiment of the invention.
Figure 11:
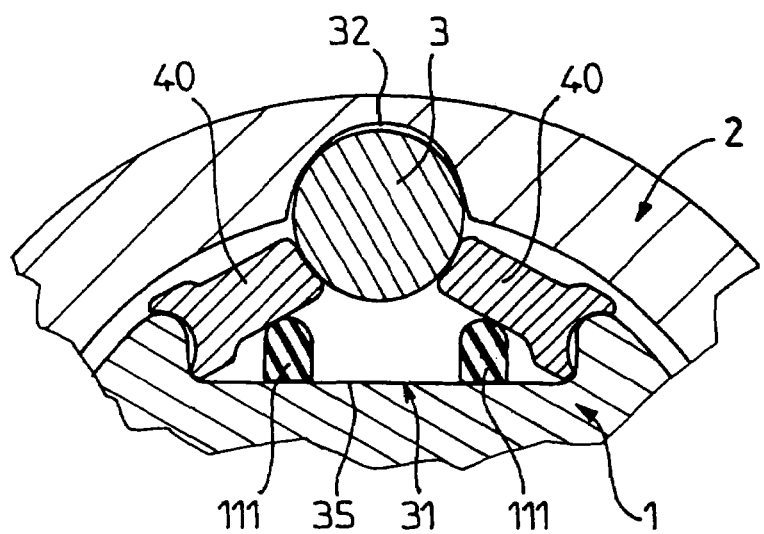
FIG. 11 is a partial cross section analogous to FIG. 5 of another embodiment of the invention.

In any of the embodiments represented in the figures, and in particular in FIGS. 10 and 11, each of the two rolling tracks 40, 60, 80, 100 may be pushed by a spring member in the form of an axial coil spring 111 that bears on the bottom 35, 55, 75, 95 of the axial groove 31, 52, 71, 92.

In any of the embodiments, each of the two rolling tracks 40, 60, 80, 100 may be pushed by a spring member in the form of an axial spring member 111, 113, 116 that bears on the bottom 35, 55, 75, 95 of the axial groove 31, 52, 71, 92.

In the embodiments represented in the figures, and in particular in FIGS. 4, 5, 6 and 10, each of the two rolling tracks 40, 60, 80, 100 may be pushed by a respective spring member. Said two spring members are connected to constitute a double spring member in the form of a double axial spring member 113. The double spring member 113 has a thin section with a rounded central portion 114 that bears on the bottom 35, 55, 75, 95 of the axial groove 31, 52, 71, 92 and two curved ends 115 that act on said rolling tracks.

In the embodiments represented in the figures, and in particular in FIGS. 7, 8 and 9, each of the two rolling tracks 40, 60, 80, 100 can be pushed by a respective spring member. The two spring members are connected to constitute a double spring member in the form of a double axial spring member 116. The double spring member 116 has a thin section with a bent central portion 117 whereof the bend 119 whereof engages in and bears on an axial housing 110 of the bottom 35, 55, 75, 95 of the axial groove 31, 52, 71, 92 and the two curved ends 118 whereof act on said rolling tracks.

As shown in FIGS. 3 to 9, the balls 3 may be disposed in three axial rows 20, the axial rows 20 being transversely at 120° to each other. The inner shaft 1 is provided with three axial grooves 31, 51, 71, 91, the axial grooves 31, 51, 71, 91 being transversely at 120° to each other. The outer shaft 2 is provided with three axial grooves 32, 52, 72, 92, the axial grooves 32, 52, 72, 92 being transversely at 120° to each other.

As is the case in FIG. 10, the balls 3 may be disposed in two diametrically opposite axial rows 20. The inner shaft 1 is provided with two diametrically opposite axial grooves 31, 51, 71, 91 and the outer shaft 2 is provided with two diametrically opposite axial grooves 32, 52, 72, 92.

As shown in FIG. 9, male grooves 23 and female grooves 24 having spaced conjugate profiles that afford a certain play are provided on the inner shaft 1 and the outer shaft 2. Thus in the event of loss of the balls 3 torque may still be transmitted between the inner shaft 1 and the outer shaft 2.

As is the case in FIGS. 4, 5, 7, 8 and 11 in particular, the spring members 111, 113, 116 can be disposed in the inner shaft 1 and pushed by the two rolling tracks 40, 80, which cooperate with the inner shaft.

Figure 12:
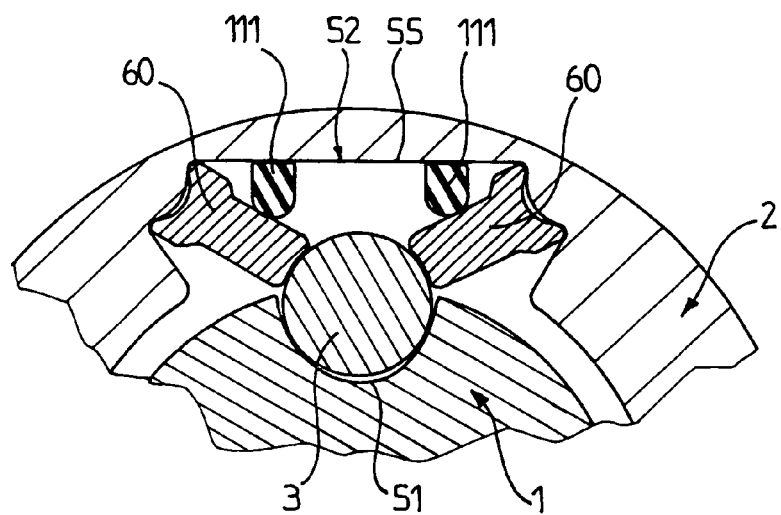
FIG. 12 is a partial cross section analogous to FIG. 6 of another embodiment of the invention.
Figure 13:
FIG. 13 shows one embodiment of an axial spring member of the invention.

As for FIGS. 6, 9 and 12 in particular, the spring members 111, 113 116 can be disposed in the outer shaft 2 and push the two rolling tracks 60, 100, which cooperate with the outer shaft.

Without departing from the scope of the invention, some of the spring members 111, 113, 116 may also be disposed in the inner shaft 1 and others in the outer shaft 2, said spring members pushing the corresponding two rolling tracks, which cooperate with the shaft concerned.

In the embodiment of FIGS. 3, 4 and 5 and FIGS. 7 and 8, the inner shaft 1 is provided with three axial grooves 31, 71. The axial grooves 31, 71 are transversely at 120° to each other. In each axial groove 31, 71 are mounted an axial spring member 113, 116 and two rolling tracks 40, 80 in the form of axial bars.

The balls 3 are disposed in three axial rows 20 which are transversely at 120° to each other.

The combination of the balls 3, the rolling tracks 40, 80 and the spring members 113, 116 is closed at each axial end by a shoulder 15 and a retaining ring 12. The retaining ring 12 engages in each of the axial grooves 31, 71 of the inner shaft 1. A sleeve 17 engages over the smooth portion of the inner shaft 1 to press on a shoulder 19.

The outer shaft 2 has three axial grooves 32, 72 transversely at 120° to each other that slide on the rows 20 of balls 3. The axial grooves 32, 72 must have the length required to allow the necessary axial sliding of the outer shaft 2 and the inner shaft 1.

Advantages inherent to features of the invention are summarized hereinafter.

The balls are in contact with one of the shafts and with the two rolling tracks. The rolling tracks are in contact with the other shaft, and can pivot on the shaft. The rolling tracks are in contact with spring members whose purpose is to maintain contact between the rolling tracks and the balls at one point. The shape of the rolling tracks aids to maintain that point of contact on the line connecting the center of the ball and the pivot point of the rolling track.

During assembly of the device, the spring members compensate the dimensional variations of the various components (one might say that they absorb tolerances by deformation of the spring members).

On application of a torque, the load is transmitted from the tube to the shaft through the balls and the rolling tracks. The line of application of the load passes through the center of the ball and the pivot point of the rolling track. Thus the load is taken up directly by the shaft without loading the spring member. The angular stiffness is very high and independent of the stiffness of the spring members.

During axial movement of the tube relative to the shaft, the sliding force of the system is a function of the loads applied to the balls by the spring members.

During application of a torque, the sliding force of the system is a function of the loads applied to the balls by the spring members and the torque applied to the system.

What we claim is:

1. A device for coupling an inner shaft and a concentrically arranged tubular outer shaft sliding one within the other in the direction of a common axis, said inner and outer shafts having adjacent peripheral surface containing axially extending concave portion, said coupling device including a plurality of balls, each of said balls being disposed between a concave portion of the inner shaft and a concave portion of the outer shaft and moving on two rolling tracks disposed one on each side of a median plane passing through the common axis and through centers of said balls;

each of the two rolling tracks cooperating with the concave portion of one of the shafts and pivots about an articulation axis parallel to the common axis, said articulation axis being situated between a sliding face and the concave portion of one of said inner shaft and outer shaft, so that each rolling track pivots at a junction of the sliding face and the concave portion;

each of the two rolling tracks being pushed against each of said balls by a spring member disposed in and bearing on said concave portion of the inner shaft;

each of said balls rolling directly against the concave portion of the outer shaft, wherein the balls are arranged in a plurality of axial rows:

each row of balls being disposed in a concave portion of the outer shaft in the form of an axial groove whose section includes two concave faces inclined to each other which come into contact with the balls of said each row:

each row of balls being disposed in a concave portion of the inner shaft in the form of an axial groove whose section includes a bottom and two flanks, the bottom being substantially perpendicular to the median plane passing through the common axis and through the axis of the centers of the balls of said each row;

two rolling tracks for each row of balls being disposed one on each side of the median plane and cooperate with the concave portion in the form of the axial groove of the inner shaft and each rolling track takes the form of an axial bar whose section has:

a bearing portion with a face adapted to come into contact with the balls of said each row:

a pivot portion in the form of a fork with a concave face that cooperates with a conjugate convex shape of a junction face disposed between the face of the inner shaft and the corresponding flank of the axial groove, the concave face and the junction face having a substantially cylindrical shape whose axis is the articulation axis; and each of the two rolling tracks is pushed by a spring member that bears on said bottom of the axial groove of the inner shaft, so that:

at rest, when there is no transmission of torque, and when active, when there is transmission of torque, each of said balls is always in contact on each side of the median plane, via one bearing area, with the corresponding rolling track disposed in one of the two shafts, and through another bearing area with the concave portion of the other shaft, and the center of each of said balls, a &enter of the bearing area with the rolling track, and a corresponding center of the articulation axis of said rolling track are always aligned.

2. A coupling device according to claim 1, wherein each of the two rolling tracks is pushed by a respective spring member, said two spring members being connected to each other to constitute a double spring member.

3. A coupling device according to claim 1, wherein spaced male and female conjugate profiles affording a certain degree of play are formed on the inner shaft and the outer shaft so that torque still is transmitted between the inner shaft and the outer shaft in the event of breakage of the balls.

4. A coupling device according to claim 1, wherein the spring members are disposed in the inner shaft and push the two rolling tracks which cooperate with the inner shaft.

5. A coupling device according to claim 1, wherein the balls are arranged in a plurality of axial rows:

each row of balls is disposed in a concave portion of one of said inner shaft and outer shaft in the form of an axial groove whose section includes two concave faces inclined to each other which come into contact with the balls of said each row;

each row of balls being is disposed in a concave portion of the other of said inner shaft and outer shaft in the form of an axial groove whose section includes a bottom and two flanks, the bottom being substantially perpendicular to the median plane passing through the common axis and through the axis of the centers of the balls of said each row;

two pivoting rolling tracks for each row of balls are disposed ore on each side of the median plane and cooperate with the concave portion in the form of the axial groove of said other of said inner shaft and outer shaft and each rolling track takes the form of an axial bar; and each of the two pivoting rolling tracks is pushed by a respective spring member, said two spring members being connected to constitute a double spring member in the form of a double axial spring member which has a thin section with a rounded central portion that bears on the bottom of the axial groove of said other of said inner shaft and outer shaft and two curved ends which act on said two pivoting rolling tracks.

6. A coupling device according to claim 1, wherein the balls are arranged in three axial rows transverse at 120° to each other:

said three axial ball rows are respectively disposed in three axial grooves of one of said inner shaft and outer shaft which are transverse at 120° to each other, the axial groove of each of said three axial ball rows having a section including two concave faces inclined to each other which come into contact with the balls of said each row;

said three axial ball rows are respectively disposed in three axial grooves of the other of said inner shaft and outer shaft which are transverse at 120° to each other, the axial groove of each of said three axial ball rows of said other of said inner shaft and outer shaft having a section including a bottom and two flanks, the bottom being substantially perpendicular to the median plane passing through the common axis and through the axis of the centers of the balls of said each row; and two pivoting rolling tracks for each row of balls are disposed one on each side of the median plane and cooperate with the concave portion in the form of the axial groove of said other of said inner shaft and outer shaft and each rolling track takes the form of an axial bar.

7. A coupling device according to claim 1, wherein the balls are arranged in three axial rows transverse at 120° to each other;

the outer shaft has three axial grooves transversely at 120° to each other which slide respectively on the rows of balls, the axial grooves having the length required to allow a required axial sliding of the outer shaft and the inner shaft, each axial groove of the outer shaft has a section including two concave faces inclined to each other which come into contact with the balls of the respective row;

the inner shaft has three axial grooves transverse at 120° to each other, and an axial spring member and two rolling tracks in the form of axial bars are mounted in each axial groove of the inner shaft;

each axial groove of the inner shaft has a section including a bottom and two flanks, the bottom being substantially perpendicular to the median plane passing through the common axis and through the axis of the centers of the balls of the respective row;

two rolling tracks for each row of balls are disposed one on each side of the median plane and cooperate with the concave portion in the form of the axial groove of the inner shaft and each rolling track takes the form of an axial bar whose section has a bearing portion with a face adapted to come into contact with the balls of said each row and a pivot portion;

each of the two rolling tracks is pushed by one of said spring members that bears on said bottom of one of said the axial groove of the inner shaft; and the combination of the balls, the rolling tracks and the spring members is closed at each end by a shoulder and a retaining ring that engages in each of the axial grooves of the inner shaft.

8. A coupling device according to claim 1 applied to an intermediate part of an automobile vehicle steering column.

9. A coupling device according to claim 1 applied to a top part of an vehicle steering column.

* * * * *